US008090520B2

(12) United States Patent
Tate, Jr. et al.

(10) Patent No.: US 8,090,520 B2
(45) Date of Patent: Jan. 3, 2012

(54) FUEL LIFE MONITOR AND ENGINE MANAGEMENT FOR PLUG-IN HYBRID ELECTRIC VEHICLES

(75) Inventors: Edward D. Tate, Jr., Grand Blanc, MI (US); Mark A. Theobald, Bloomfield Hills, MI (US)

(73) Assignee: GM Global Technology Operations LLC

( * ) Notice: Subject to any disclaimer, the term of this patent is extended or adjusted under 35 U.S.C. 154(b) by 724 days.

(21) Appl. No.: 11/758,887

(22) Filed: Jun. 6, 2007

(65) Prior Publication Data

US 2008/0167788 A1 Jul. 10, 2008

Related U.S. Application Data

(60) Provisional application No. 60/883,855, filed on Jan. 8, 2007.

(51) Int. Cl.
*G06F 7/00* (2006.01)
*B60K 6/20* (2007.10)

(52) U.S. Cl. ....................... 701/104; 701/102; 180/65.28

(58) Field of Classification Search .......... 701/102–105, 701/110, 112, 114; 180/65.1, 65.2, 65.21, 180/65.28; 123/520; 60/698, 716; 477/3; 903/905; 73/114.38, 114.54, 114.55, 290 R, 73/304 R, 304 C; 702/50, 55, 183
See application file for complete search history.

(56) References Cited

U.S. PATENT DOCUMENTS

| | | | |
|---|---|---|---|
| 4,426,980 A * | 1/1984 | Eisele et al. | 123/478 |
| 4,847,768 A | 7/1989 | Schwartz et al. | |
| 5,672,051 A * | 9/1997 | Forgue et al. | 417/44.11 |
| 5,785,138 A * | 7/1998 | Yoshida | 180/65.245 |
| 6,342,027 B1 * | 1/2002 | Suzuki | 477/5 |
| 6,695,895 B2 * | 2/2004 | Hyodo et al. | 96/111 |
| 6,897,629 B2 * | 5/2005 | Wilton et al. | 318/139 |
| 6,935,311 B2 * | 8/2005 | Visser et al. | 123/406.47 |
| 7,219,005 B2 * | 5/2007 | Mazet | 701/104 |
| 7,471,003 B2 * | 12/2008 | Kobayashi et al. | 290/40 C |
| 2004/0046394 A1 * | 3/2004 | Lim | 290/40 C |
| 2005/0074656 A1 * | 4/2005 | Koyama et al. | 429/34 |
| 2005/0118468 A1 * | 6/2005 | Adams et al. | 429/22 |
| 2006/0019135 A1 * | 1/2006 | Curello et al. | 429/22 |
| 2006/0213186 A1 * | 9/2006 | Pott | 60/285 |
| 2006/0231304 A1 * | 10/2006 | Severinsky et al. | 180/65.2 |
| 2007/0093359 A1 * | 4/2007 | Kobayashi et al. | 477/107 |
| 2007/0144175 A1 * | 6/2007 | Sopko et al. | 60/605.1 |
| 2007/0234990 A1 * | 10/2007 | Shiino et al. | 123/179.16 |
| 2007/0278021 A1 * | 12/2007 | Pott et al. | 180/65.2 |

OTHER PUBLICATIONS

Claudia Veronica D'Ornellas, "The Effect of Ethanol on Gasoline Oxidation Stability", SAE Technical Paper 2001-01-3582, Reprinted from SI and Diesel Engine Performance and Fuel Effects (SP-1645), Sep. 24-27, 2001, 9 pages.

Ernane Ribeiro Streva, Leonardo Vinicius Mendes Pereira and Jose Ricardo Sodre, Vanya Marcia Duarte Pasa, "Gasoline-Ethanol Blend Aging Effects on Engine Performance and Exhaust Emissions", SAE Technical Paper 2003-01-3184, 2003, 7 pages.

(Continued)

*Primary Examiner* — Willis Wolfe, Jr.
*Assistant Examiner* — Johnny Hoang

(57) ABSTRACT

An engine management system for a hybrid vehicle may include a hybrid vehicle controller that selects a power source to be one of an electric propulsion system and a combustion engine. The hybrid vehicle controller may include an engine operation module configured to determine when operation of the combustion engine is required based on a predetermined set of operating parameters associated with the combustion engine.

10 Claims, 3 Drawing Sheets

OTHER PUBLICATIONS

Howard L. Fang, David M. Stehouwer and Jerry C. Wang, "Interaction Between Fuel Additive and Oil Contaminant: (II) Its Impact on Fuel Stability and Filter Plugging Mechanism", SAE Technical Paper 2003-01-3140, 2003, pp. 1-10.

In-Sik Rhee, "Microbiogical Contamination in JP-8 Fuel", SAE Technical Paper 2005-01-1802, Reprinted from: Military Vehicle Technology (SP-1962), Apr. 11-14, 2005, 8 pages.

Itsuki Miyata, Yasunori Takei, Kazushi Tsurutani and Masanori Okada, "Effects of Bio-Fuels on Vehicle Performance: Degradation Mechanism Analysis of Bio-Fuels", SAE Technical Paper 2004-01-3031, Reprinted from Alternative and Oxygenated Fuels (SP-1897), 2004, 11 pages.

Leo L. Stavinoha, Steve Howell, "Potential Analytical Methods for Stability Testing of Biodiesel and Biodiesel Blends", SAE Technical Paper 1999-01-3520, 1999, pp. 1-15.

S.R Reddy, "Evaporative Emissions from Gasolines and Alcohol-Containing Gasolines with Closley Matched Volatilities", 1987 Society of Automotive Engineers, Inc., pp. 6.760-6.778.

* cited by examiner

FUEL LIFE MONITOR AND ENGINE MANAGEMENT FOR PLUG-IN HYBRID ELECTRIC VEHICLES

CROSS-REFERENCE TO RELATED APPLICATIONS

This application claims the benefit of U.S. Provisional Application No. 60/883,855, filed on Jan. 8, 2007. The disclosure of the above application is incorporated herein by reference.

FIELD

The present disclosure relates to hybrid vehicles, and more specifically to engine management for hybrid vehicles.

BACKGROUND

The statements in this section merely provide background information related to the present disclosure and may not constitute prior art.

Internal combustion engines produce drive torque that is transferred to a drivetrain. The drive torque is transferred through a transmission that multiplies the drive torque by a gear ratio. Transmissions generally include multiple gear ratios through which the drive torque is transferred. Automatic transmissions automatically shift between gear ratios based on driver input and vehicle operating conditions. Hybrid powertrains typically include an electric machine and an energy storage device (ESD). In one mode, the electric machine drives the transmission using energy stored in the ESD. In another mode, the electric machine is driven by the engine to charge the ESD.

When operated in the first mode, the hybrid vehicle may be operated without the use of the engine. During operation in the first mode, extended periods of time may pass between consecutive operations of the engine. Due to these extended time periods of non-operation, the combustion engine may develop corrosion and lubrication issues. Additionally, when the engine is not operated, the fuel supply remains unused. When the fuel ages it may deteriorate, resulting in reduced engine performance, such as higher engine emissions when the engine is operated. Further, the on-board vapor recovery system can saturate during long periods of electric-only propulsion with fuel sloshing in the tank and when there is no purge flow through the vapor canister.

SUMMARY

Accordingly, an engine management system for a hybrid vehicle may include a hybrid vehicle controller that selects a power source to be one of an electric propulsion system and a combustion engine. The hybrid vehicle controller may include an engine operation module configured to determine when operation of the combustion engine is required based on a predetermined set of operating parameters associated with the combustion engine.

A method of controlling the hybrid vehicle may include providing motive power to the vehicle through the electric propulsion system, determining an elapsed time from when the combustion engine was last operated, and operating the combustion engine based on the elapsed time being greater than a predetermined value.

A method of controlling the hybrid vehicle may alternatively or additionally include determining the age of the fuel in a fuel reservoir for the combustion engine and determining whether engine-on operation is required based on the age of the fuel being greater than a predetermined value.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
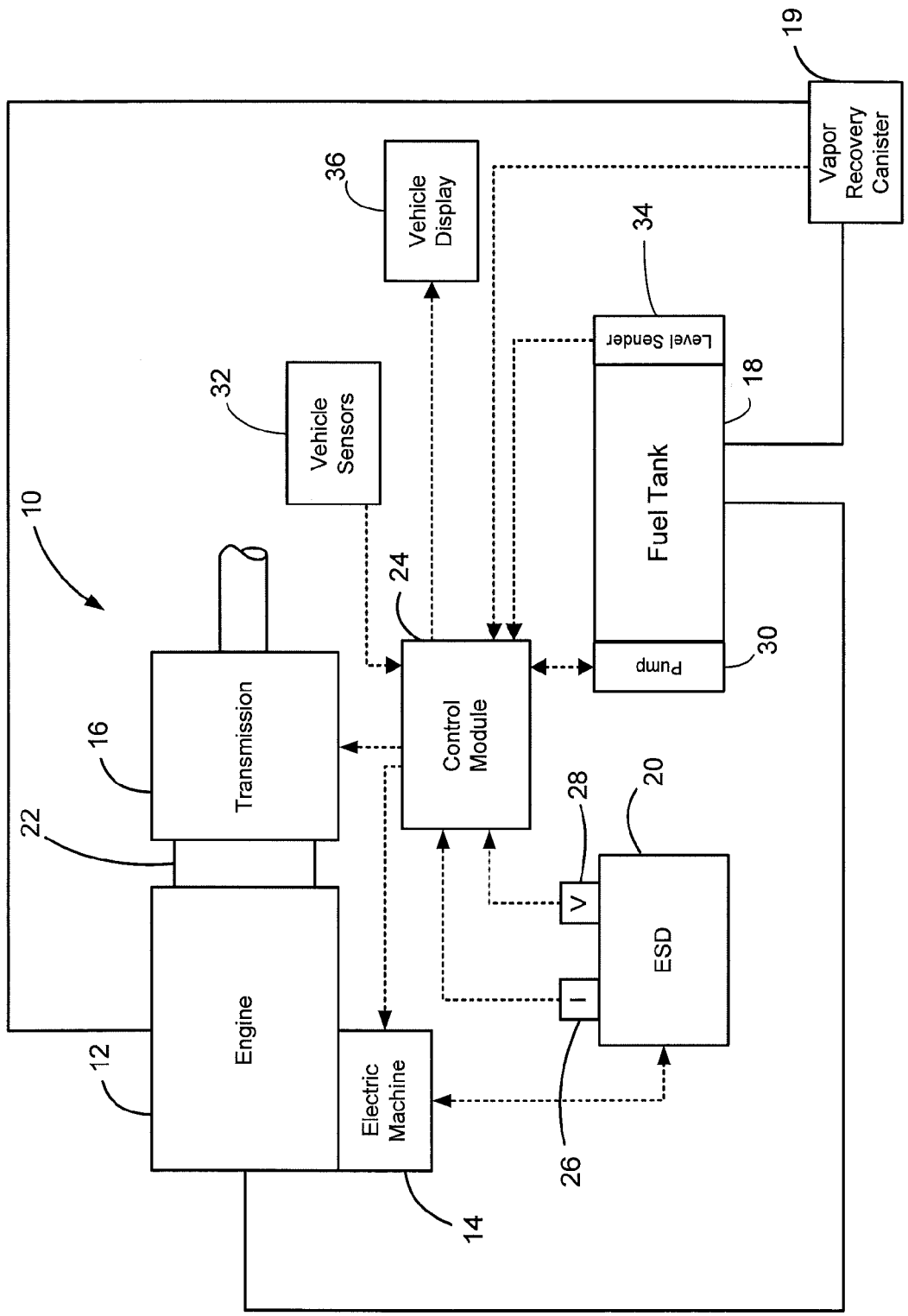
FIG. 1 is a schematic illustration of a hybrid vehicle according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary hybrid vehicle 10 is schematically illustrated. The hybrid vehicle 10 includes an engine 12 and an electric machine 14, which selectively drive a transmission 16. Hybrid vehicle 10 may be a plug-in type hybrid vehicle or any other type of hybrid vehicle that is capable of extended periods of operation without operation of engine 12. Engine 12 is in communication with a source of fuel, such as fuel tank 18 and an on-board vapor recovery canister 19 in communication with fuel tank 18. In one mode of vehicle operation, the electric machine 14 and the engine 12 provide drive torque to drive the transmission 16. In this manner, fuel efficiency may be increased and emissions may be reduced. In another mode of operation, the engine 12 drives the electric machine 14 to generate power used to recharge an energy storage device (ESD) 20, such as a battery. In another mode of operation, the electric machine 14 solely provides drive torque to the transmission 16 using energy from the ESD 20. In yet another mode of operation, the engine 12 may solely provide the requisite drive torque to the transmission 16.

The engine 12 and the electric machine 14 can be coupled via a belt-alternator-starter (BAS) system (not shown) that includes a belt and pulleys. Alternatively, the engine 12 and the electric machine 14 can be coupled via a flywheel-alternator-starter (FAS) system (not shown), wherein the electric machine 14 is operably disposed between the engine 12 and the transmission 16. It is anticipated that other systems can be implemented to couple the engine 12 and the electric machine 14 including, but not limited to, a chain or gear system that is implemented between the electric machine 14 and a crankshaft.

The transmission 16 can include, but is not limited to, a continuously variable transmission (CVT), a manual transmission, an automatic transmission, an electrically variable hybrid transmission, and an automated manual transmission (AMT). Drive torque is transferred from the engine 12 and/or electric machine 14 to the transmission 16 through a coupling device 22. The coupling device 22 can include, but is not limited to, a friction clutch or a torque converter depending upon the type of transmission implemented. In the case of a CVT, the coupling device 22 includes a torque converter and a torque converter clutch (TCC). The transmission 16 multiplies the drive torque through one of a plurality of gear ratios to drive a vehicle driveline (not shown).

A control module 24 regulates operation of the vehicle 10 based on the control system of the present disclosure. A current sensor 26 generates a current signal that is sent to the control module 24 and a voltage sensor 28 generates a battery voltage signal that is sent to the control module 24. The control module 24 determines a state of charge (SOC) of the ESD 20 based on the current and voltage signals. There are several methods that can be implemented to determine the SOC. An exemplary method is disclosed in commonly assigned U.S. Pat. No. 6,646,419, issued on Nov. 11, 2003 and entitled State of Charge Algorithm for Lead-Acid Battery in a Hybrid Electric Vehicle, the disclosure of which is expressly incorporated herein by reference.

Control module 24 may signal operation of the engine 12 when required, as discussed below. Control module 24 may provide and/or receive signals for operation of a fuel pump 30 when operation of engine 12 is required. Control module 24 may receive signals from vehicle sensors 32, such as ambient temperature, and signals from a fuel level sender 34 indicative of a fuel level in fuel tank 18. Control module 24 may provide a signal to a vehicle display 36 indicative of vehicle operating conditions such as fuel age and elapsed time between engine operations.

Figure 2:
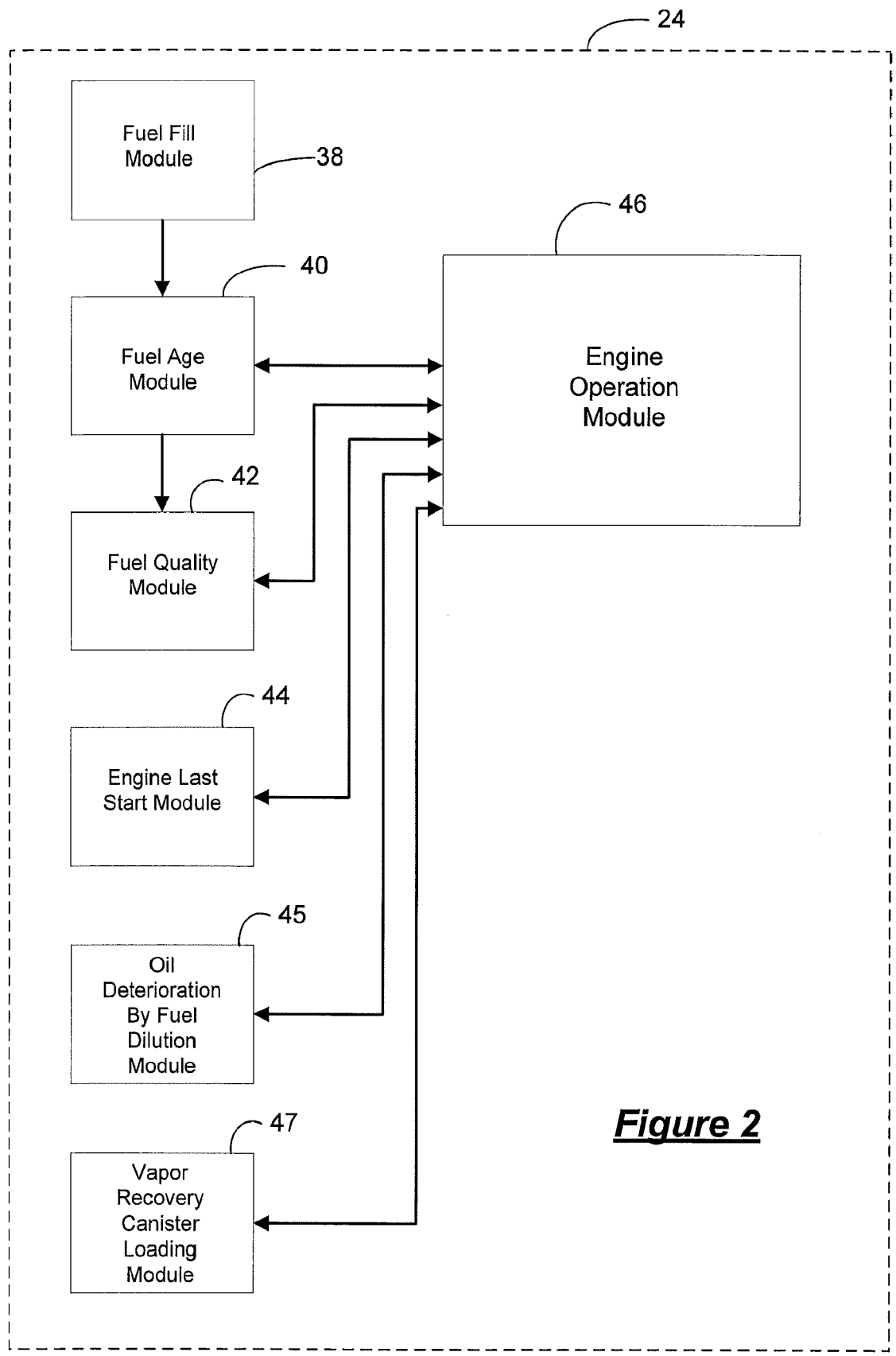
FIG. 2 is a functional block diagram of modules of the control module shown in FIG. 1.

With additional reference to FIG. 2, control module 24 may include a fuel fill module 38, a fuel age module 40, a fuel quality module 42, an engine last start module 44, an oil deterioration by fuel dilution module 45, a vapor recovery canister loading module 47, and an engine operation module 46. The fuel fill module 38 may determine whether fuel has been added to fuel tank 18 and the quantity added. Fuel fill module 38 is in communication with fuel age module 40. Fuel age module 40 may determine an age of the fuel in fuel tank 18. The fuel age determination may be at least partially based on the fuel fill information provided by fuel fill module 38. Fuel age module 40 is in communication with engine operation module 46 and fuel quality module 42.

Fuel quality module 42 may determine a deterioration level of the fuel in fuel tank 18. The determination of fuel deterioration level may be at least partially based on the fuel age information provided by fuel age module 40 and ambient storage temperature from vehicle sensors. Fuel quality module 42 may receive and evaluate information relating to fuel type, such as gasoline or ethanol blends, and provide a signal to engine operation module 46 to operate the engine 12 at the next vehicle start-up. Engine last start module 44 may determine the elapsed time between consecutive operations of engine 12. Engine last start module 44 is in communication with engine operation module 46.

Oil deterioration by fuel dilution module 45 may be in communication with engine operation module 46. Oil deterioration by fuel dilution module 45 may determine the condition of engine lubricating oil based on a fuel dilution level thereof. Vapor recovery canister loading module 47 may be in communication with engine operation module 46. Vapor recovery canister loading module 47 may determine the canister loading through vehicle driving statistics and temperature information. Engine operation module 46 may determine whether engine-on operation is required.

Figure 3:
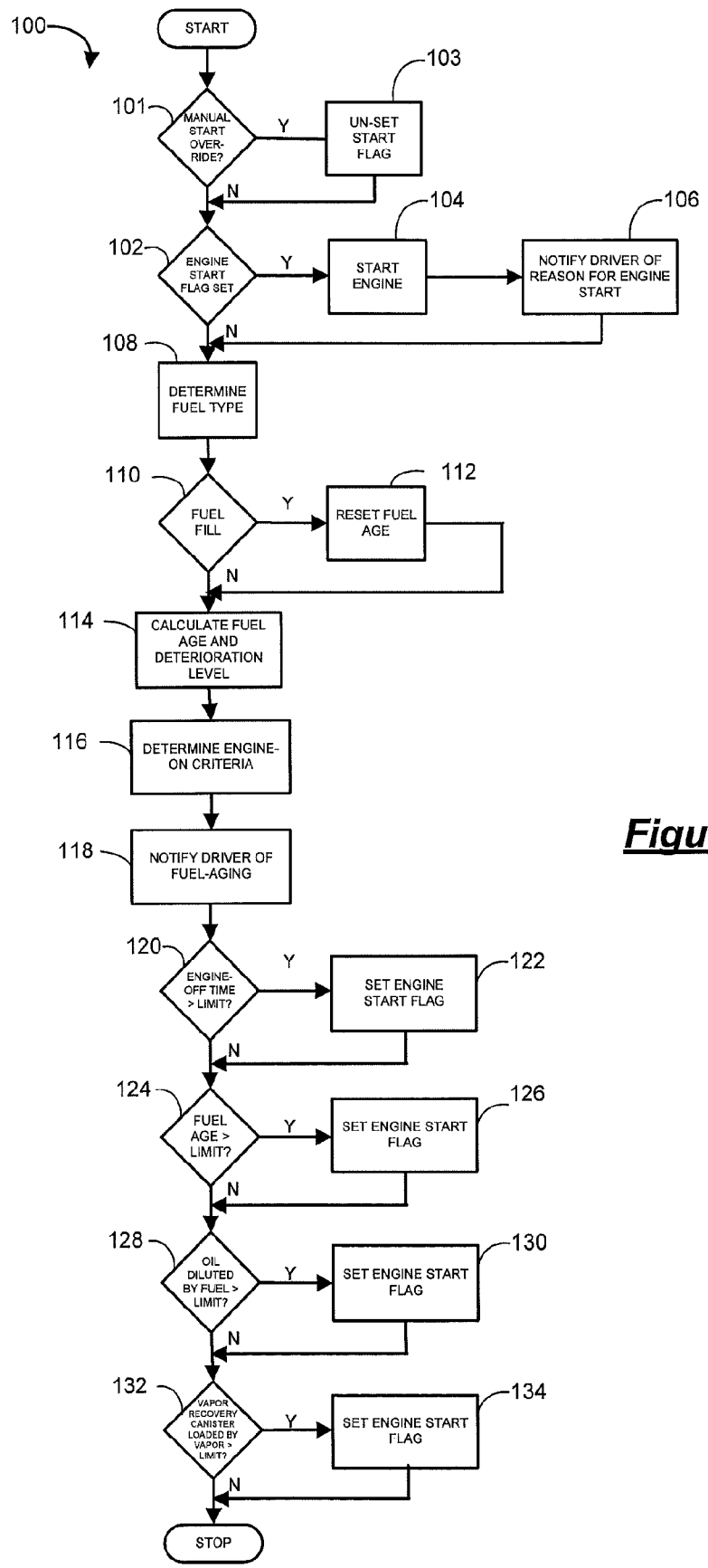
FIG. 3 is a flow chart depicting a control logic for a hybrid vehicle according to the present disclosure.

As seen in FIG. 3, the flow chart illustrates control logic 100 providing a method of controlling hybrid vehicle 10. Once vehicle 10 has been powered on, determination block 101 determines whether a manual engine-start override is desired. If a manual engine-start override is desired, an engine start flag set and stored in control module 24 during a previous iteration may be reset at control block 103. Control logic 100 may then proceed to determination block 102. If a manual engine-start override is not desired, control logic 100 may proceed to determination block 102. Determination block 102 evaluates whether an engine start flag was set and stored in control module 24 during a previous operation of vehicle 10. If an engine start flag was previously set, control logic 100 proceeds to control block 104, where engine 12 is automatically started. Engine 12 may then be operated for a predetermined period of time. Control logic 100 then proceeds to control block 106, where the driver of vehicle 10 is notified of the reason for the engine start. After notification, control logic 100 proceeds to control block 108. Referring to determination block 102, if no flag was set during previous operation of vehicle 10, control logic 100 proceeds to control block 108 as well.

Control block 108 determines the type of fuel used in vehicle 10. This determination may be based on an input from a sensor or a driver input. Once the fuel type is determined, control logic 100 proceeds to determination block 110.

Determination block 110 evaluates whether fuel has been added to fuel tank 18. If fuel has been added, control logic 100 proceeds to control block 112 where a fuel age is reset within control module 24 to an adjusted value. Control logic 100 then proceeds to control block 114. If fuel has not been added, control logic 100 proceeds to control block 114 as well.

Control block 114 determines a fuel quality level indicated by an age and deterioration level of the fuel. Fuel age and deterioration level may be determined based on a number of inputs including ambient temperature measurements from vehicle sensors 32, calibration values, fuel tank level measurements from fuel level sender 34, elapsed time between fuel fills and the amount of fuel added during fuel fills. Each of these inputs may be stored within or provided to control module 24. Control logic 100 then proceeds to control block 116.

Control block 116 determines operating criteria for engine 12. Specifically, control block 116 begins with a nominal set of engine-on criteria. These criteria may include operating engine 12 when the load on ESD 20 exceeds a predetermined value or when the state of charge of ESD 20 falls below a predetermined level. Using the fuel age and deterioration level, or fuel quality level, determined at control block 114, engine-on operating criteria may be biased toward an engine-on condition. For example, the values of maximum load on ESD 20 and the minimum charge level required prior to an engine-on condition may be adjusted to increase the occurrence of an engine-on condition. This may reduce the overall time that fuel will remain in fuel tank 18 unused. Control logic 100 may then proceed to control block 118.

Control block 118 notifies the driver of a fuel age. The notification may include an indication of the amount of time since fuel was last used or some other indication of fuel aging. Control logic 100 then proceeds to determination block 120.

Determination block 120 evaluates whether an elapsed time between engine-on conditions has exceeded a predetermined limit. Engine 12 may require a certain frequency of operation to ensure proper lubrication and corrosion control. If the elapsed time between engine-on conditions has exceeded a predetermined time limit, control logic 100 proceeds to control block 122 where an engine start flag is set.

The engine start flag may be stored by control module 24 and may initiate an engine-on condition during a subsequent vehicle use when detected at determination block 102. Alternatively, the engine start flag may initiate an engine-on condition automatically when set. Control logic 100 may then proceed to determination block 124. At determination block 120, if the elapsed time between engine starts does not exceed the predetermined limit, control logic 100 also proceeds to determination block 124.

Determination block 124 evaluates whether a fuel age has exceeded a predetermined limit. If the fuel age has exceeded the predetermined time limit, control logic 100 proceeds to control block 126 where an engine start flag is set. The engine start flag may initiate an engine-on condition during a subsequent vehicle operation when detected at determination block 102. Control logic 100 may then proceed to determination block 128. At determination block 124, if fuel age does not exceed the predetermined limit, control logic also proceeds to determination block 128.

Determination block 128 evaluates whether the oil is diluted by fuel beyond a predetermined limit. If the oil dilution has exceeded the predetermined limit, control logic 100 proceeds to control block 130 where an engine start flag is set. The engine start flag may initiate an engine-on condition during a subsequent vehicle operation when detected at determination block 102. Control logic 100 may then proceed to determination block 132. If the oil dilution has not exceeded the predetermined limit, control logic 100 also proceeds to determination block 132.

Determination block 132 evaluates whether the vapor canister is loaded by fuel vapor beyond a predetermined limit. If the vapor loading has exceeded the predetermined limit, control logic 100 proceeds to control block 134 where an engine start flag is set. The engine start flag may initiate an engine-on condition during a subsequent vehicle operation when detected at determination block 102. Alternatively, the engine start flag may initiate an engine-on condition automatically when set. Control logic 100 may then terminate. If the vapor loading has not exceeded the predetermined limit, control logic 100 may terminate.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. An engine management system for a hybrid vehicle, comprising:
    a control module that selects a power source to be an electric propulsion system during a first period and a combustion engine during a second period, the control module including an engine operation module configured to determine when operation of the combustion engine is required based on a predetermined set of operating parameters associated with the combustion engine, the predetermined set of operating parameters being related to characteristics of a fuel system of the combustion engine based on non-operation of the combustion engine.

2. The engine management system of claim 1 further comprising a fuel age module configured to determine an age of fuel in a fuel reservoir for the combustion engine.

3. The engine management system of claim 2 wherein the engine management system commands operation of the combustion engine when said fuel age module determines a fuel age that exceeds a predetermined limit.

4. The engine management system of claim 1 further comprising a fuel quality module configured to determine a deterioration level of fuel in a fuel reservoir for the combustion engine.

5. The engine management system of claim 4 wherein the engine management system commands operation of the combustion engine when said fuel quality module determines a fuel deterioration level that exceeds a predetermined limit.

6. The engine management system of claim 1 further comprising an engine last start module configured to determine an elapsed time between consecutive engine operations.

7. The engine management system of claim 6 wherein the engine management system commands operation of the combustion engine when said engine last start module determines an elapsed time between consecutive engine operations that exceeds a predetermined limit.

8. The engine management system of claim 1 further comprising a fuel fill module configured to determine an addition of fuel to a fuel reservoir for the combustion engine.

9. The engine management system of claim 1 further comprising an oil deterioration module configured to determine an oil deterioration level of the engine based on a fuel dilution of the oil.

10. The engine management system of claim 1 further comprising a vapor recovery cannister loading module configured to determine a vapor loading level of a vapor recovery cannister of the engine.

* * * * *